US007701595B2

(12) United States Patent
Carling et al.

(10) Patent No.: US 7,701,595 B2
(45) Date of Patent: Apr. 20, 2010

(54) PRINT JOB COST ESTIMATE METHOD AND SYSTEM

(75) Inventors: Richard R. Carling, Webster, NY (US); Victor I. Ibarluzea, Brockport, NY (US); Sankarshanan Anantham, W. Henrietta, NY (US); Hwai-Tzuu Tai, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1147 days.

(21) Appl. No.: 11/321,246

(22) Filed: Dec. 29, 2005

(65) Prior Publication Data

US 2007/0153311 A1 Jul. 5, 2007

(51) Int. Cl.
*G06F 3/12* (2006.01)

(52) U.S. Cl. .......................... 358/1.13; 399/24; 399/79; 347/7; 347/85; 347/86

(58) Field of Classification Search ................ 358/1.13; 399/79, 24; 347/7, 85
See application file for complete search history.

(56) References Cited

U.S. PATENT DOCUMENTS 5,956,157 A 9/1999 Tai
6,064,838 A * 5/2000 Maruta et al. ................. 399/79
6,507,409 B2 1/2003 Kawaguchi
6,536,865 B2 3/2003 Sarmast
6,625,403 B2 9/2003 Carling et al.
6,718,285 B2 4/2004 Schwartz et al.
6,722,281 B2 4/2004 Yamamoto
6,796,627 B2 9/2004 Kimura et al.
6,862,110 B2 * 3/2005 Harrington .................. 358/1.9
2002/0037177 A1 * 3/2002 Kanoshima et al. ........... 399/79
2003/0091352 A1 5/2003 Carling et al.
2005/0080750 A1 * 4/2005 Carling et al. .............. 705/400
2006/0203272 A1 * 9/2006 Manalo et al. ............ 358/1.13

FOREIGN PATENT DOCUMENTS

JP 11-084963 3/1999
JP 2002-067451 3/2002
JP 2003-228261 8/2003

* cited by examiner

*Primary Examiner*—Mark K Zimmerman
*Assistant Examiner*—Jacky X Zheng
(74) *Attorney, Agent, or Firm*—Donna P. Suchy

(57) ABSTRACT

Automatically determining the cost of a printed job on a digital printing press before the job is run. A job control component in the digital front end of the printing press collects and stores the processing information from the job processing components from prior runs. A job-reporting component displays the stored and estimated processing information and automatically computes and displays the estimated cost of the job. The method includes determining a future toner cost using a toner cost, a future press usage cost, and a substrate cost based on historical toner consumption and then rasterizing the job to determine the total job cost.

18 Claims, 6 Drawing Sheets

TONER COST + SUBSTRATE COST + PRESS WARE COST = JOB COST

TONER COST + SUBSTRATE COST + PRESS WARE COST = JOB COST

PRINT JOB COST ESTIMATE METHOD AND SYSTEM

FIELD OF THE INVENTION

This invention relates in general to a print job cost estimate and more specifically to a system and method for estimating the cost of printer press consumables, including toner and press wear, prior to printing the job.

BACKGROUND OF THE INVENTION

Press owners and operators are constantly put in a situation where they are required to estimate the cost of printing a customers print job before it is printed. The customer wants assurances that the cost is acceptable, so that they have the ability to choose another print service provider if necessary. The owner wants assurances that the price they give is an accurate reflection of their cost so they can stay competitive while maintaining a profit.

Even pricing the cost of a job after it is run is extremely difficult. The only directly determinable costs are those of the substrate used. In practice, the most costly consumable is the toner (or ink) usage of the job. Unless the job is very large, where the toner can be measured in bottles, it is difficult to determine how much toner a specific job consumed.

Commercial products are currently available to estimate the toner coverage that a specific PostScript or PDF print job will require. These tools require the user to enter a coverage-to-cost factor to estimate the actual toner cost. The problem with these tools is that although they automate the estimation of toner coverage, they leave it to the user to determine an accurate cost factor. The cost factor is a very labor-intensive value to derive. For an accurate estimate, coverage must be broken down by intensity and consider the relationship of coverage and intensity to actual toner usage, which is not linear. Also, these tools do not take into account the substrate size, but only give a single area coverage value and assume the user is working with a fixed substrate size. For these reasons, these tools are very limiting since they require a significant number of manual calculations to be performed outside of the tool. At a minimum, press owners are required to track each job printed, the substrate size used and the toner consumption to allow them to estimate the cost of a specific new job. Even after a job is printed, unless the job is extremely large, there is no direct way to accurately determine how much toner was used. Realistically, the usual course of action is to take the weekly or monthly print volume and divide this by the total monthly toner usage. This kind of coarse estimate does not account for different substrate sizes or for differences in the toner lay-down (coverage-intensity information) of the specific jobs run.

An additional significant component of the cost of operating a press print job is the cost of the wear on the press. There is currently no product available that can automatically calculate the cost of wear on the press. Only service plans that provide a fixed per-page click charge provide a mechanism to determine a value for this cost. For service plans that are not based on a click charge, such as a NexPress press that allows the press operator to maintain and replace all components that are subject to wear, the cost of wear on the press is the cost of the individual wear on the complete set of operator replaceable components (ORCs) other than toner, that are required to be maintained for proper operation of the press. In a NexPress product, there are over 150 ORCs that contribute to the cost of running the press. The complexity of tracking this level of cost information manually is impractical.

For these reasons, there is a need for a system and method for determining a cost for a specific end user print job in an automated way that does not require extensive record keeping on the part of the user.

SUMMARY OF THE INVENTION

This invention is directed to automated cost determination of the cost to produce a complete print job on a printing device. By determining historical cost relationships for toner consumption, press wear and substrates, these relationships can then be used to predict the cost of running a specific print job on that press.

The method includes determining a future toner cost, a future press usage cost, and a substrate cost based on historical toner consumption and press wear and then rasterizing the job and applying cost coefficients to the resulting data to determine the total job cost.

In one embodiment there are two sets of operations that are performed separately. First a set of cost coefficients, referred to as the press-cost coefficients (PCC), is calculated. This set of cost coefficients generally include three separate cost coefficients including a toner cost coefficient (TCC), a press-wear coefficient (PWC) and a substrate cost coefficient (SCC). There is a separate TCC required for each color channel supported by a specific press. The PWC is generally a single value that is obtained by aggregating consumable wear costs for all consumables excluding toner.

The second set of operations determines the job cost values (JCV) for a specific job to be cost estimated, one for each PCC. Together the two provide the ability to calculate the cost of the job.

The invention, and its objects and advantages, will become more apparent in the detailed description of the preferred embodiment presented below.

BRIEF DESCRIPTION OF THE DRAWINGS

The invention and its technical advantageous effects will be better appreciated from the ensuing detailed description of a preferred embodiment, reference being made to the accompanying drawings in which.

DETAILED DESCRIPTION OF THE INVENTION

Figure 1:
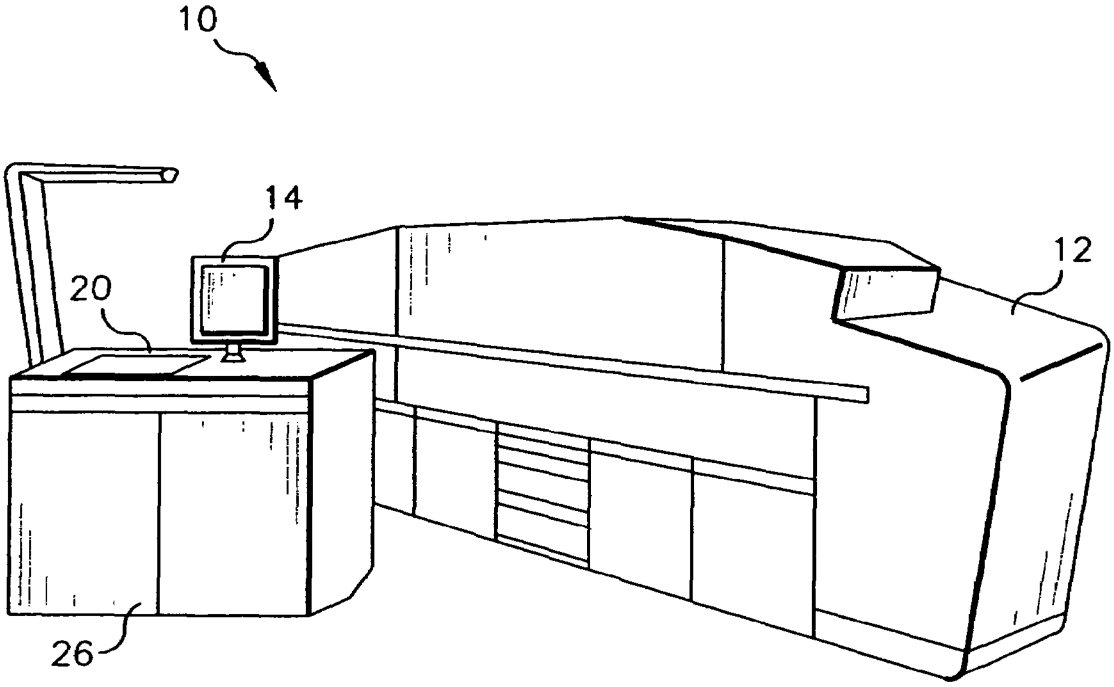
FIG. 1 is a schematic drawing of a digital printing press, in which the method of the present invention may be implemented.
Figure 2:
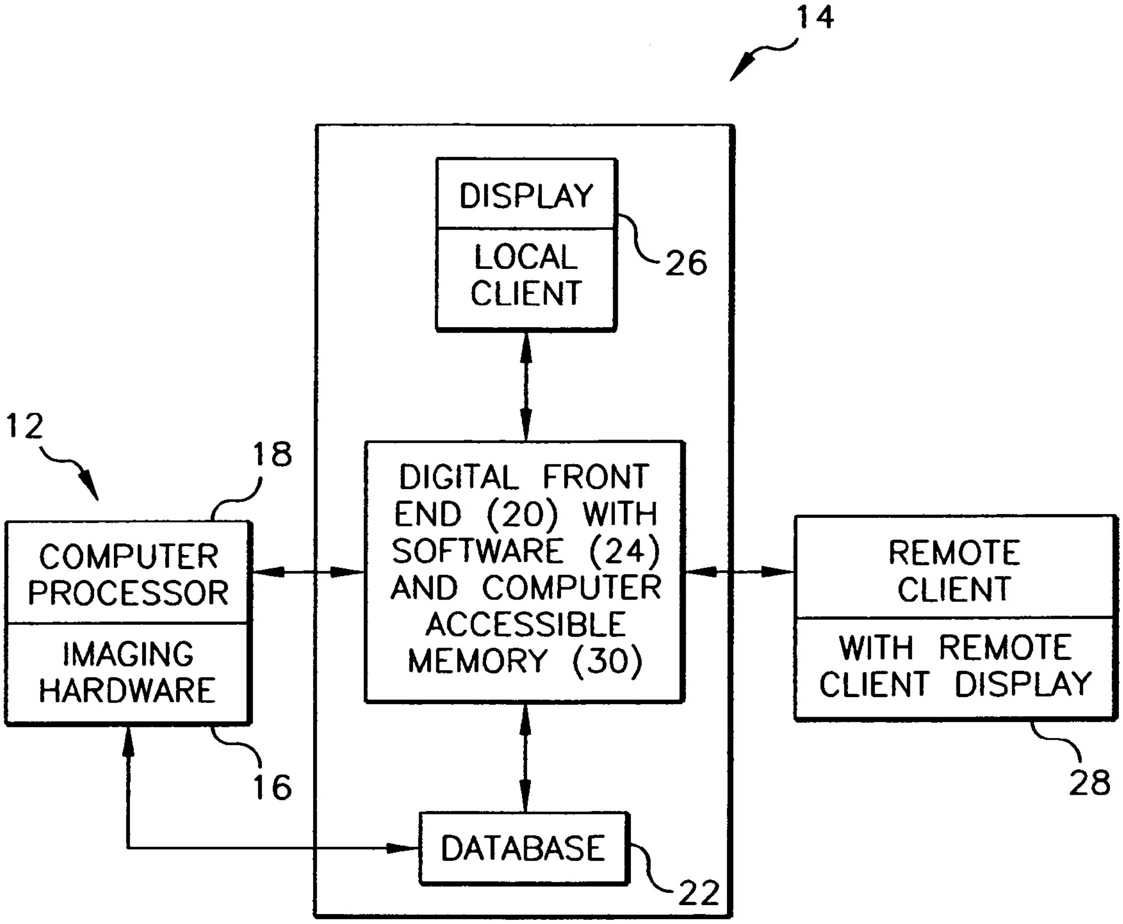
FIG. 2 is a block diagram representation of the digital printing press in FIG. 1A.

Referring to FIG. 1, there is shown a schematic line drawing of a digital printing press 10, for example, a NexPress 2100 Digital Production Color Press, in which the method of the present invention may be used. The printing press is often referred to as a printer 10. FIG. 2 depicts the same digital press in block diagram format including a print engine 12 and an operator interface 14. The print engine 12 contains the printing process components that convert a raster pixel input into hard copy printed output. The printing process components in the print engine 12 include the imaging hardware 16 and the computer processor 18 that controls the imaging hardware. The operator interface 14 contains the computational devices, henceforth referred to as the digital front end (DFE) 20, that perform all of the necessary pre-printing steps to convert the job file into the raster pixel format to be sent to the print engine 12. The operator interface 14 also contains an internal or external database 22 and graphical user interface software 24 for interacting with the operator via graphical user interface display 26 or with the press owner via a remote client computer and display 28. The database could be associated with computer accessible memory 30 in many parts of the system such as the digital front-end and software, operator interface 14, computer processor 18 and/or the imaging hardware 16 or could even be remotely located so that communication is wired and/or wireless.

For any job submitted to the printer 10, the jobs page description language can be processed into a raster form and this output analyzed to provide a quantitative measurement of how the print job expends toner, puts wear on the press and consumes the substrate. Given a specific set of these job specific measurements (JSM), it is possible to transform them into a set of job cost values (JCV) that have a one-to-one correspondence to the press cost coefficients (PCC) for a specific printing press that when multiplied together can be used to estimate the cost printing the job. The job specific measurements that need to be calculated are the number of surfaces (each side of a substrate) to be printed, the number of pages to be printed (some pages may have just one surface), and the toner consumption by color channel. The press cost coefficients (PCC) that are required are the toner cost coefficient (TCC) for each color channel, press wear coefficient (PWC), and substrate cost coefficient (SCC). By determining values for the JCVs from the JSMs for a specific print job and multiplying them by their corresponding PCCs it is possible to assign a cost for printing this job on a specific printing press.

Figure 3:
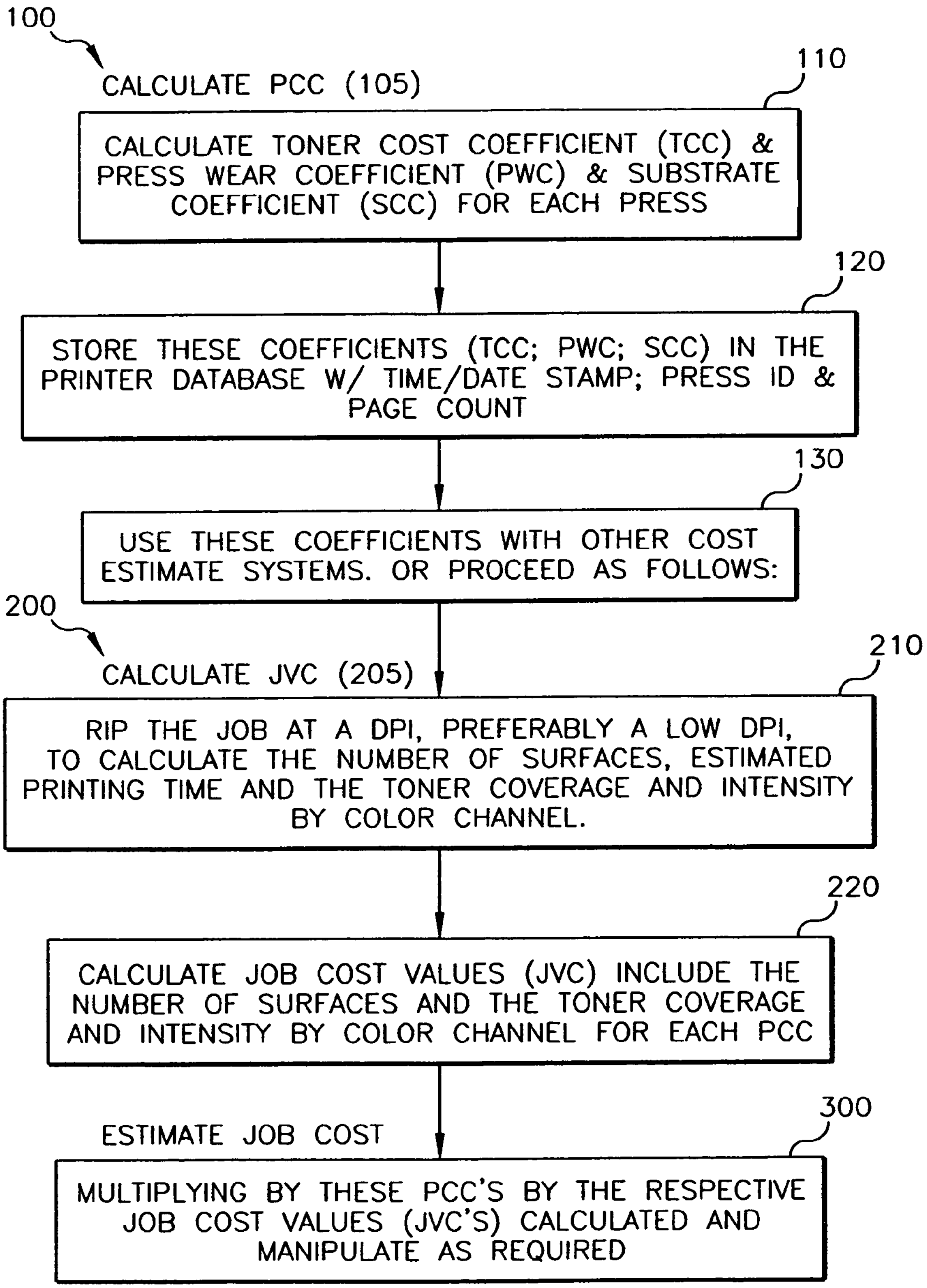
FIG. 3 is a block diagram representation of the method of the present invention as practiced in the digital printing press in FIG. 1A.

The method for calculating the job cost estimate includes two sets of operations 100, 200 that can be performed separately as shown in FIG. 3. The first operation 100 determines a set of cost coefficients, referred to as press-cost coefficients (PCC), 105 in step 110. This set of cost coefficients generally includes three separate cost coefficients including a toner cost coefficient (TCC) 120, a press-wear coefficient (PWC) 130, and a substrate cost coefficient (SCC) 140. There is a separate TCC required for each color channel supported by a specific press. The PWC is generally a single value that is obtained by aggregating consumable wear costs for all consumables excluding toner. These PCCs are then stored 120 in the data base 22 which is accessible by the printer to automatically calculate the total job cost in conjunction with similarly generated JCVs in the second set of steps 200 or they can be used in conjunction with other cost estimate systems 130.

The set of job cost values (JCV) 205 must be also determined for each specific job to be cost estimated. There must be one JVC 205 for each PCC 105. The job cost values (JVC) 205 are calculated after the job is rasterized (or ripped) and screened as shown in step 210, preferably at a lower DPI than the real job will use, to calculate 220 the number of surfaces and pages, estimated printing time and the toner consumption by color channel. The cost of the total print job 300 is estimated by multiplying the applicable JCVs by the respective PCCs. The job cost values (JVC) required include the toner mass consumption (JTU), number of surfaces to be printed (JSUR), and the number of pages printed (JPAGE).

Each printing press tracks the time each operator replaceable component (ORC) is replaced by a press operator by inserting an ORC replacement record into a database table. The first series of calculations for the press coefficients uses the timestamp of the replacement, the press page counters, the average life of the ORC as well as the quantity of the ORC replaced which are stored as a record in the ORC replacement table of the database. Each press also tracks each job printed by the system and more specifically the Job ID, number of surfaces and pages printed and the toner consumption for each job run through the press. This information is stored in the job statistics object (JSO) table of the database. This information will be used to calculate the PCCs needed to complete the job cost estimate. These capabilities are further discussed in U.S. Pat. No. 6,718,285, which describes a component life tracking system along with U.S. Patent Application Publication No. 2005-0080750. These systems describe how to track and calculate accurate toner and other ORC costs so that for a specific print job an accurate cost to print can be derived.

Since toner is typically the most expensive and variable cost associated with a print job, the calculation of TCC is critical. TCC is calculated by determining the relationship of toner coverage and density to the number of grams of toner actually used. To determine this relationship the toner surface consumption of every job printed within a specific date range must be tracked against the number of toner bottles replaced. This is recorded for each color channel supported. The information must be tracked over a significant amount of time (as an example, over the last ten toner bottle replacements), so that an accurate relationship can be determined. With the availability of the on-going job data and the on-going ORC usage data, it is possible to determine an accurate cost for both toner and other non-toner press wear associated with print jobs. The non-toner press wear (or ORC cost) can be derived down to a fixed constant that is directly related to the page surface count of the job for each press owned. This allows the press owner to precisely estimate the customer's job cost based on the JSM values of toner coverage, pixel density and number of surfaces and pages of the print job. Hence, the historical toner cost and actual ORC consumable wear characteristics for each specific press owned can be determined. U.S. Pat. No. 6,625,403 (Personalization of operator replaceable components) covers some of the details of why press wear may be different for each press owned by a specific press shop.

The steps for determining the press cost coefficients (PCC) will be discussed first, starting with the steps for determining the TCC, PWC and SCC. Subsequently the steps for determining the Job Cost values (JCV) are described. The definition of coefficient should be considered as the numerical measure of a ratio of physical or chemical properties that is constant for a system under specified conditions such as the coefficient of friction. As the conditions within the press change, the coefficients are periodically recalculated to maintain the relationship.

The most complex cost coefficient to determine is the cost of toner for a print job. This toner cost is the most significant and variable cost of operating the press. The following section details the determination of the toner cost coefficient for a specific press.

Steps for Determining Toner Cost Coefficients (TCC)

Figure 4:
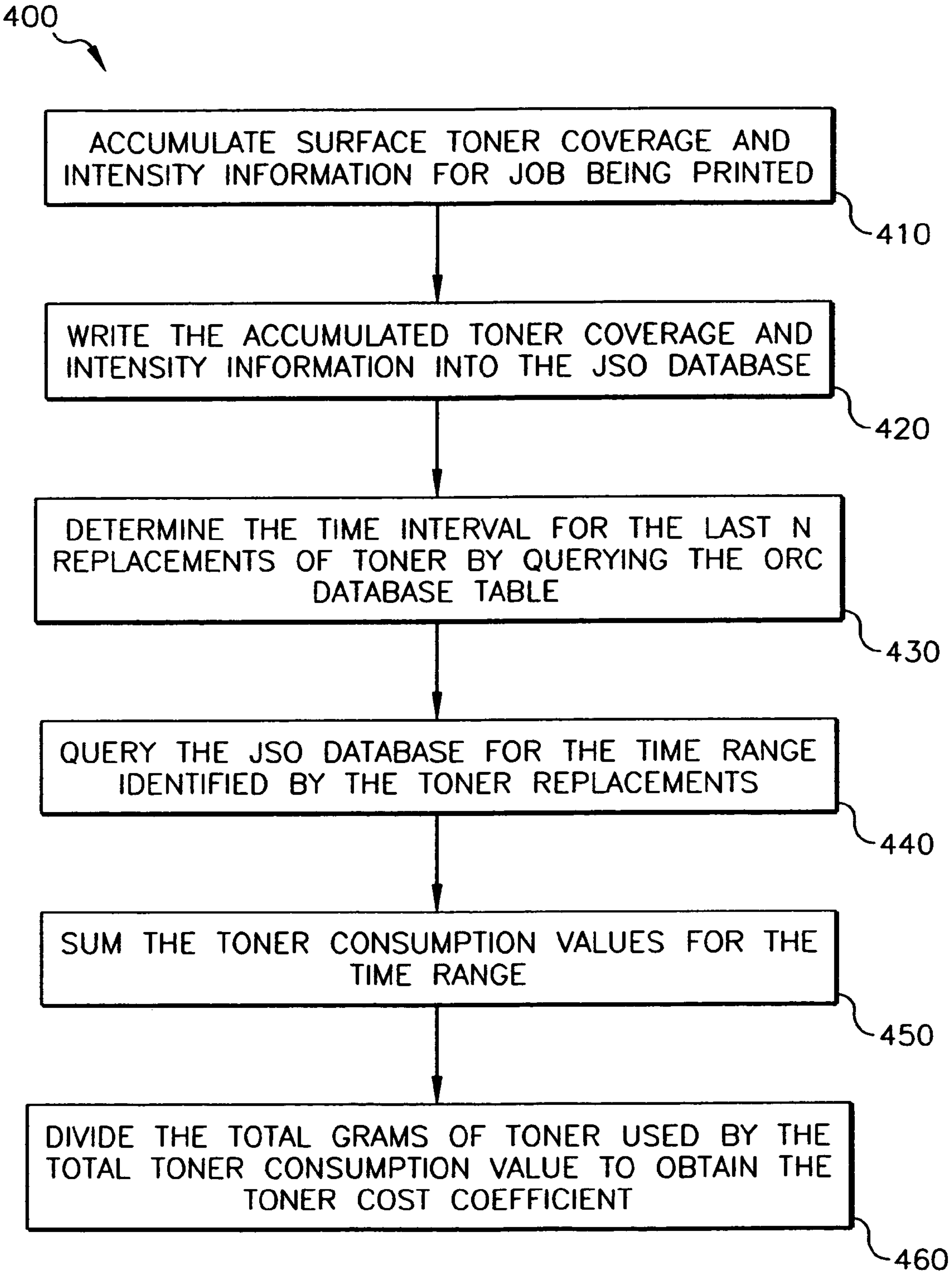
FIG. 4 is block diagram of the steps involved in determining a Toner Cost Coefficient (TCC).

To determine the toner cost coefficient the toner consumption for every print job is continuously stored within a JSO from data obtained after the surfaces of the job have been ripped and screened. This provides a continuous set of historical usage data from which toner consumption information for any specific time period can be queried. The following 10 steps are followed to generate this information. FIG. 4 summarizes the following 10 steps required to determine the toner cost coefficients (TCC), (one for each color channel), in a condensed flow chart 400. The first step 410 is to calculate and accumulate the surface toner consumption for the job as follows in the steps 1-5. Step 420 is to write the accumulated toner consumption information into the database 22 as discussed below in step 6. Finally, as discussed below in steps 7-10, the time interval for the last N replacements of toner is determined by first querying 430 the ORC database table and then querying 440 the JSO database for the identified time range and the toner consumption identified within this time range is summed 450 and the total weight (grams) of toner used is divided by the total toner consumption value 460 to determine the toner cost coefficient. The ten steps are as follows:

1. To capture the coverage and pixel intensity information for each color channel, the page description data is rasterized to convert it into a continuous tone image representation. A halftoning process is performed on the continuous tone pixel data by indexing the pixel data through a specific halftone screen defined for the pixel intensity. As an example of a method used in grayscale printing systems to transform raster continuous tone pixel data into screened pixel data refer to U.S. Pat. No. 5,956,157. The screened page buffer (sheet surface) data is scanned by row and column. In the preferred embodiment the rasterized data is processed after screening. In some implementations the actual halftone screens used and the screened raster data may not be accessible and only the rasterized contone data before screening is available. In such an implementation the contone data is used, additional details of this are discussed in step 10 below.

Figure 5:
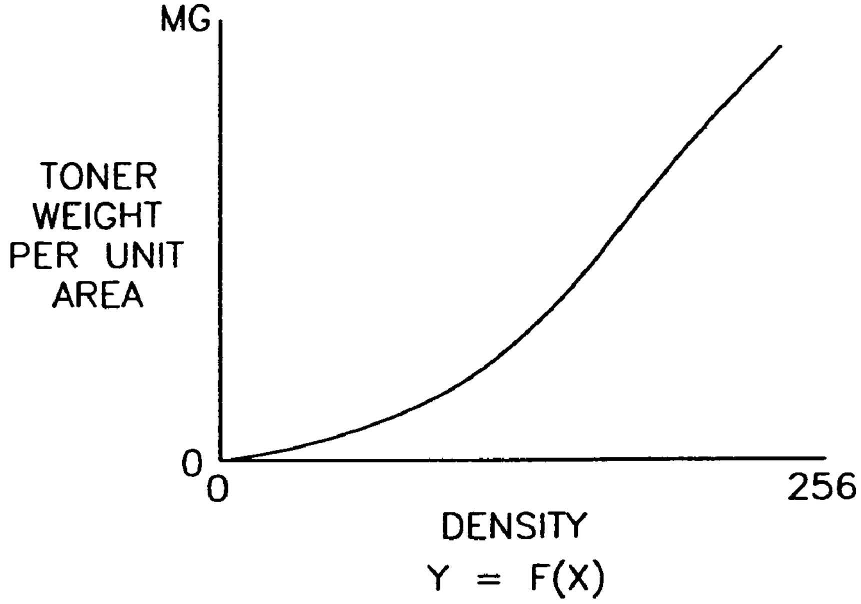
FIG. 5 shows the relationship between screened toner density data and toner mass.

2. The toner usage is based on a toner consumption printer-related relationship. In a calibrated printing system, the target ink density to be printed on the paper demands a certain amount of toner mass laydown. For example, a solid ink density of 1.5 on paper requires a toner mass of 0.5 mg/cm^2. There is a nonlinear relationship between toner mass and density. The relationship of screened toner density data to toner mass is established for the printer. This is accomplished by weighing a fixed amount of substrate before printing, printing the substrate with a screen based on a contone image of constant intensity and measuring the weight of the substrate after printing without fusing. This is repeated at 10% intervals in image intensity between 0 and 255 to establish the relationship between contone intensity, screen toner density and toner mass. The nonlinear characteristics of intensity vs. toner mass establishes the toner consumption model as shown in FIG. 5. The toner density of each screened pixel position can then be related to the toner mass per unit area using this relationship. The screen output data at each pixel is mapped through the function y=f(x) shown in FIG. 5. This function converts the toner density (x) into a weight per unit area (y). Since the relationship of density to toner mass is non-linear, this step must be applied before the toner data can be aggregated to a single consumption value.

3. The individual toner mass at each screened pixel position is aggregated to provide toner consumption for the complete surface. Each color channel will have a separate raster surface with its own toner consumption value associated with it.

4. When the surface completes printing a Surface-Complete event is sent to the Print Processor containing the four toner consumption values (5 values if a 5 color press or more if needed).

5. When the Surface-Complete event is received by the Print Processor, the surface toner consumption values for each color channel are aggregated into a corresponding set of job level toner consumption values $JTU_{Black}$, $JTU_{Cyan}$, $JTU_{Magenta}$, $JTU_{Yellow}$, one for each color channel, until all surfaces of the print job have been processed.

6. The toner consumption of each color channel for the job are stored continuously in a Job Statistics Object (JSO) within the DFE database, one for each job run (and each time it is re-run). Each JSO contains a unique key, the job ID of the job printed, number of surfaces printed, toner coverage consumption values, job name, processing times and other data described later.

7. With the persistent storage in the database of the toner consumption, it is possible to calculate toner consumption for all jobs processed by the printer over any specific period of time. Recalculation of toner consumption can be performed on a regular basis to account for changes in the press toner and developer efficiency from wear, humidity, manufacturing changes and replacement of other interacting components (such as the fuser) within the press. For any specific period of time (t1 to t2), the toner consumption of a specific color channel CMY or K is the sum of all corresponding Job Toner Consumption values (jtc) for that color channel for jobs printed within that time frame.

$$\sum_{t2-t1} JTU_{Black}1 + JTU_{Black}2 \ldots JTU_{Black}n =$$

$$jtc\text{Total} = \text{Total mass of toner consumed for a specific color channel for all jobs } (1 \ldots n) \text{ within this specific time range.}$$

8. The next step is to identify a time range in each channel of toner that covers a specific count of replacements. The larger this window of time, the less likely small fluctuations in actual toner consumption within the toner storage container in the press will affect total accuracy. The greater the period of time, the more likely that component wear within the press will affect the efficiency of the press. Historical analysis has shown that ten bottles of toner replacement provides a good compromise of these competing factors. This historical toner bottle replacement information is continuously stored in the ORC replacement data in the DFE database.

Each time Toner or other Press Consumables are replaced, a record is written into the ORC replacement table of the database, this record identifies the Catalog number of the ORC replaced (its ID), time the ORC was replaced, the quantity of the ORC replaced, the amount of life the ORC had when replaced, the average life based on the last ten replacements and a replacement code that identifies why the ORC was replaced (such as "End of Life"). If there are internal or external factors that change then there may be a need to recalculate the total toner costs in a different manner and based on more or less then the last ten replacements. For example, the replacement of an extremely worn fuser roller can have a significant impact on the toner cost coefficient. With no modification to the calculation of the toner cost coefficient the toner cost will not reflect the complete adjustment in toner consumption until ten toner replacements have been performed from the time the fuser roller is replaced, in such cases there may be a need to recalculate the total toner cost based on less toner replacements after replacement of this ORC.

A database query is performed on the ORC replacement table to retrieve all ORC replacements of the specific Toner, if Black Toner had a catalog number of "21004", then a query such as "Select * from ORC_RPL_TABLE where ORC_RPL_TABLE.ID=21004 order by ORC_RPL_TABLE.time descending". The records returned would have the most recent replacement ordered first, and then each previous replacement consecutively ordered in the replacement records returned. The date for the most recent replacement of black toner would be first; we will label this time, Time_Latest. Ten records down is the $11^{th}$ replacement, which gives us the time that the $10^{th}$ bottle was fully consumed; we will label this time as Time_Earliest.

9. For a specific toner color K, once the time range has been determined it is then used to generate a query against the job statistics table in the database to capture the required job toner consumption information jtcK for the jobs printed in the identified time range. That is, a query is performed on the JSO_TABLE to retrieve all jobs processed during the period of time identified, the query would be as follows: "Select * from JSO_TABLE where JSO_TABLE.time>=Time_Earliest and JSO_TABLE.time<=Time_Latest order by JSO_TABLE.time descending". This would provide the set of JSO records that were run during the time the ten bottles of black toner were used in the press.

10. The job toner coverage sequences contained in each JSO record that are associated with the specific color channel CMY and K of interest and within the specified time range are summed to generate the aggregate toner consumption information.

$$\sum_{t2-t1} JTU_{Black}1 + JTU_{Black}2 \ \ldots \ JTU_{Black}n =$$

$$jtc\text{Total}_{black} = \text{Total sum of black toner consumed by all jobs } (1 \ldots n) \text{ within this specific time range}_{t2-t1} \text{ for black toner replacements.}$$

The other colorants would have similar aggregates performed based on their specific time ranges for the ten toner bottle replacements performed.

$$\sum_{ct2-ct1} JTU_{Cyan}1 + JTU_{Cyan}2 \ \ldots \ JTU_{Cyan}n =$$

$$jtc\text{Total}_{cyan} = \text{Total sum of cyan toner cosnumed by all jobs } (1 \ldots n) \text{ within this sepcific time range}_{ct2-ct1}.$$

$$\sum_{mt2-mt1} JTU_{Magenta}1 + JTU_{Magenta}2 \ \ldots \ JTU_{Magenta}n =$$

$$jtc\text{Total}_{magenta} = \text{Total sum of magenta toner consumed by all jobs } (1 \ldots n) \text{ within this specific time range } mt2 - mt1.$$

$$\sum_{yt2-yt1} JTU_{Yellow}1 + JTU_{Yellow}2 \ \ldots \ JTU_{Yellow}n =$$

-continued $$jtc\text{Total}_{yellow} = \text{Total sum of yellow toner consumed by all jobs } (1 \ldots n) \text{ within this specific time range}_{yt2-yt1}.$$

The weight, in this case, the total number of actual grams of toner used over this time range is then divided by the total calculated toner usage value jtcTotal to create a constant toner_grams_per_calculated_job_mass (gjmK), shown below, that when multiplied by a new job toner usage value for a job to be cost estimated, generates the exact grams of toner required to print the job (this is done for each color channel).

$$gjmK = \text{gramsToner}/jtc\text{Total}$$

Using the actual grams of toner consumption in direct relationship to the calculated toner consumed (gramsToner/jtcTotal) allows for the generalization of the empirically derived mapping depicted in FIG. 5 to all cases where the linear relationship holds. This has been determined to hold true for contone data and for other halftone and stochastic screens. This relationship also holds true for alternate toner compositions that may have a different mass. This gives considerable generalization in the application of this relationship by not requiring exact mass units only linearly related mass, and then using the actual toner consumption to relate the computed mass consumption to actual mass consumption. For example if a halftone screen has not been empirically mapped to an exact density to weight relationship, another possible preexisting or calculated from current data such as that shown inn FIG. 5 related to the halftone screen can be used since the mass units will be related to the actual mass values.

The toner cost coefficient for a specific color channel can then be calculated as follows:

$$TCC = gjtK * \text{cost\_Gram\_Toner}$$

And the toner cost for that color channel for a specific job to be estimated will be:

$$\text{Toner\_Cost} = TCC * JTU$$

As discussed above, in the preferred embodiment the toner consumption data should be determined after screening the job. The estimation based on intensity before screening, in general, will not be as accurate as the intensity after screening since knowledge of the screening process used is incomplete.

Figure 6:
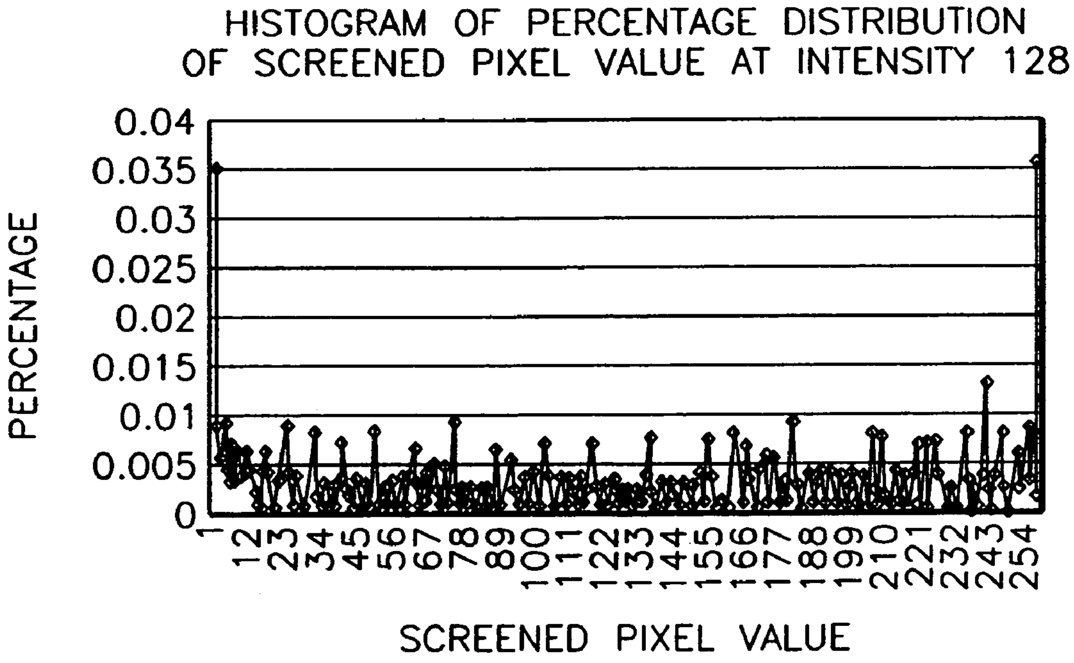
FIG. 6 shows a typical distribution of screened toner data for a corresponding contone image of constant intensity.

The percentage distribution of screened pixel values of each contone intensity level can be tabulated. The percentage distribution of screened pixel of intensity 128 is illustrated in FIG. 6 that shows an un-even distribution of screened pixel values. There are more percentages rendered at value "255" and "0" then other values. The value "255" means that pixel will be fully exposed by the writer while the value "0" means that pixel will not be exposed at all by the writer. The percentage distribution of screened pixels at other intensity has different distributions that are based on the screening model. There are 256 different distributions for an 8-bit intensity.

If no knowledge of the screening process is available, an alternative method of creating the toner consumption model without the detailed screening knowledge is to treat the screening process as a black box and determine this relationship by empirical analysis. This involves generating sample prints created at each RIP contone value and then weighting them before and after printing without fusing to determine the relationship of RIP contone intensity to toner consumption.

The nonlinear characteristics of RIP contone intensity vs. toner mass consumption has been identified to be very similar to that of screened data as represented in FIG. 5. Because the actual distribution of the screened pixels after the screening process is unknown, the accuracy of this method provides an inferior estimation of the exact units of mass, but does allow the linear relationship of contone toner density to toner mass used in to be used.

Since the toner cost coefficient (TCC) is based on actual toner consumption by replacement of toner bottles within the press in relation to calculated surface mass consumption, and the nonlinear consumption relationship represented in FIG. 5 through empirical analysis has been found to be consistent with a wide range of screens as well as with contone image data (although the precise mass measurements may not always be known), this mapping from non-linear contone pixel data to linear toner mass can be performed with the knowledge that the relationship of the calculated surface mass to the actual consumed mass will be consistent and linear with relation to other calculated surface mass. Therefore by using the toner replacement information to map the calculated surface mass to actual toner consumption provides the required toner relationship to give the required accuracy for these implementations where halftone screen information is not available.

Steps for Determining the Press Wear Coefficient (PWC)

The three significant costs of a job related to the running of the Press are the toner cost, the substrate cost and the wear cost of the press. In a NexPress, the press maintains over a hundred separate operator replaceable components (ORCs) that allows the press to be maintained by the press operator. There are also a set of Field Engineer replaceable components (FRCs) that wear out significantly slower and are replaced at significantly longer intervals. Tracking of FRCs is identical to the ORC tracking and will be combined into just an ORC cost for the rest of this disclosure.

For each specific press, the ORCs within the press adapt their predicted life to their replacement history within the press (U.S. Pat. No. 6,625,403 entitled Personalization of Operator Replaceable Components). Each time an ORC is replaced, a record is written into the ORC replacement table of the database (ORC_RPL_TABLE), this record identifies the Catalog number of the ORC replaced (its ID), time the ORC was replaced, the quantity of the ORC replaced, the amount of life the ORC had when replaced, the average life based on the last 10 replacements and an operator entered replacement code that identifies why the ORC was replaced (such as “End of Life”).

All of the ORCs contained in the press also maintain a record in a separate ORC_TABLE. When the press is powered up all ORC records in the ORC_TABLE are loaded into memory. When the press is powered down the data is written back into the ORC_TABLE. The ORC table maintains the ORC ID, the current average (or expected) life, its remaining life and a history of the last ten replacements. The values used for current life and average life are all based on a single sided sheet printed on the press, which corresponds to one surface being printed. If a double-sided page is printed, this is counted as two sheets. In this way separate counters are not required to track single sided and double sided pages, the double sided pages add twice the wear of a single sided page.

The ORC history provides an efficient mechanism for calculating a new average life for a specific ORC after it has been replaced. The ORC history maintains the time the ORC was replaced, the press page count at the time of replacement and the amount of wear (number of pages printed) the ORC had when replaced. Each time an ORC is replaced, as well as writing a record into the ORC replacement table, the ORC history structure is updated with the most recent replacement and the oldest replacement is dropped from the ORC’s history data. The ORC is also stored back into the persistent ORC_TABLE to avoid loss in case of power failure. Having the ORC history allows the current average life of the ORC to be calculated directly from its history without requiring additional database queries to be performed on the ORC replacement table.

Having the expected life for each ORC in the press available in memory provides a simple and direct method for determining the wear factor for printing a single sheet of substrate in relation to that specific ORC. Given a specific ORC, its cost per page is simply the cost of the ORC divided by the predicted life of the ORC based on its replacement history. The cost for wear on the press is then the sum of these costs for each ORC within the press.

In a preferred embodiment the predicted life of an ORC it is determined using the following equation:

$$ORC\text{Life}=(\text{HistoryLife1}+\text{HistoryLife2}+\text{HistoryLife3}+\ldots+\text{HistoryLife}N)/N$$

ORC cost per page is then $\text{ORC}_{cpp}$=ORC_Cost/ORCLife

Cost of all ORCs 1 . . . K within the Press for one substrate surface is then the sum of their individual costs with the exclusion of the Toner ORCs:

Total Cost per substrate surface (or TCss)

$$TC_{SS}=\sum_{1\ldots K} ORC_{cpp1}+ORC_{cpp}2+\ldots+ORC_{cpp}K$$

The cost for press wear is then the total number of substrate surfaces within a job multiplied by the TCss.

Press Wear Cost (PWC)=jobSurfaces×TCss.

The Press Wear Cost is recalculated on a periodic basis or when a change in one or more of the ORC costs occurs.

Figure 7:
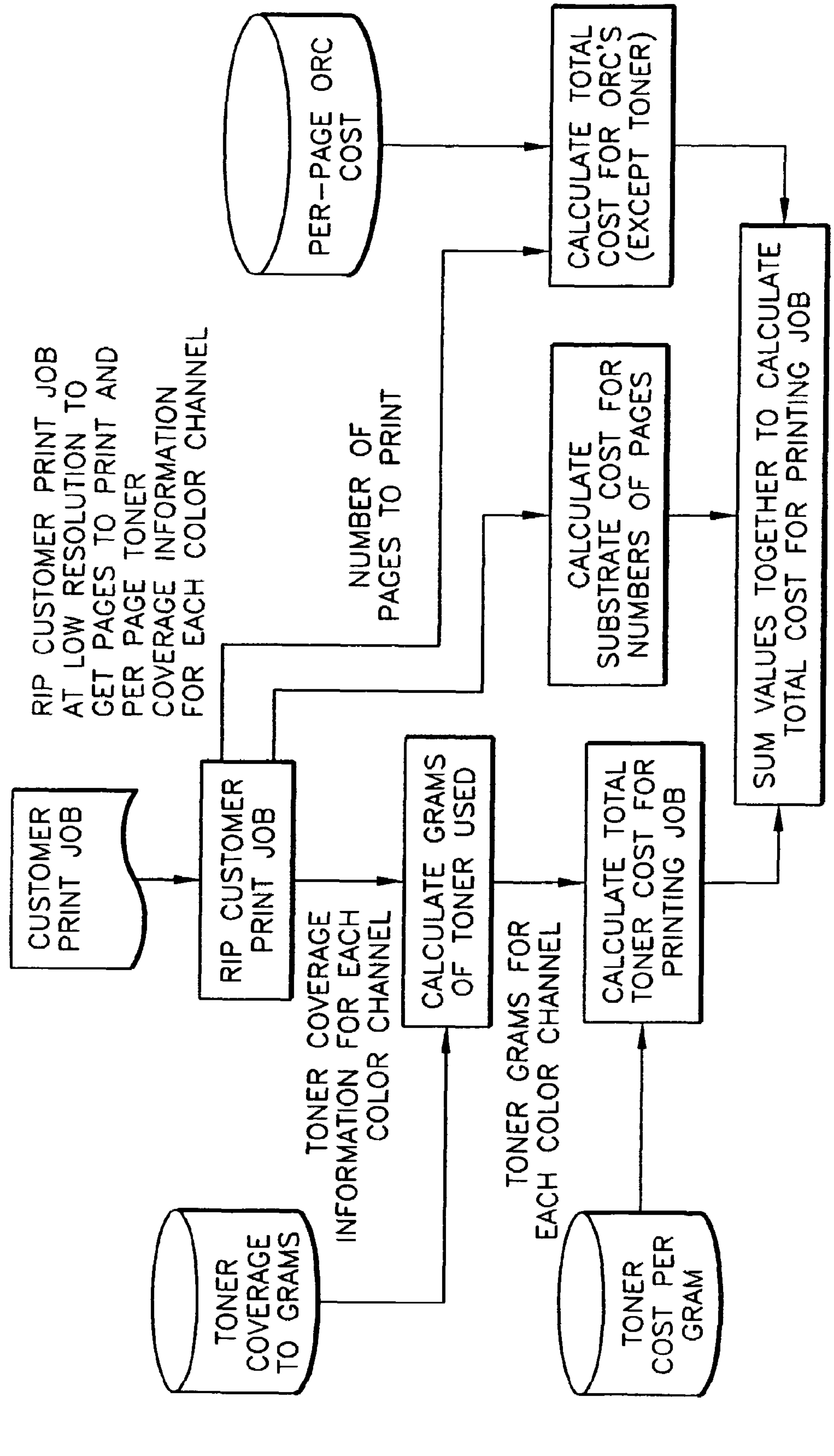
FIG. 7 is a block diagram representation of one embodiment of the digital printing press method.

The total cost to print the job is then the sum of the substrate cost, toner cost and press wear cost is illustrated in FIG. 7.

Steps in Determining the Substrate Cost Coefficient (SCC)

The Substrate Coefficient is obtained directly by the cost of a box of substrate divided by the number of pages of substrate supplied in a box.

SCC=Substrate Cost Per Page=Bulk_Substrate Cost/Pages_Purchased.

Steps Involved in Determining the Job Cost Values (JCVs)

After the Printer Cost Coefficients (PCCs) are calculated the Job Cost Values must be determined before the total print job cost can be determined. For determining the cost of a Print job, the Job specific measurements (JSMs) that need to be calculated are the number of surfaces (each side of a substrate) printed, the number of pages that will be printed and toner coverage and intensity by color channel. Through a simple transformation described below, the JSMs are converted into the Job Cost Values or JCVs.

At the local laptop/end-user end that runs the job-costing tool, the Job to be priced is submitted to the tool. A Job Control Component is responsible for stepping the job through the sequence of processing steps necessary to convert the job file, submitted electronically in a page description file format, into a raster pixel format for each substrate surface (the process of Rasterizing or Ripping the Job). A screen is applied to the raster data (when possible) and the surface data is then mapped to a Toner mass to convert it to a numerical linear relationship that is then summed for all surfaces of a specific color. The Toner density values must be mapped to a mass representation that is linear, otherwise summing the data would create excessive error that could not be recovered. An alternate approach using multiple individual bins per surface per color to keep the non-linear representation has been implemented, with the linearization being applied at a later step, this proved to be a less efficient approach with regard to data storage requirements and complexity. Each pixel intensity is mapped through a function y=f(x) that maps the non-linear relationship of toner density (or pixel intensity) into the linear relationship of toner mass.

In order to efficiently determine the cost of a Print Job, it is ripped at a lower dot per inch resolution (dpi) then that which is used for the press. Printing presses usually use a resolution of 600 dpi or higher, computer displays usually operate at a resolution of 72-100 dpi. The job to be cost estimated is ripped at the lower resolution of 75 dpi that is within the range used in the design phase to provide quick availability of the toner consumption data. Those knowledgeable in the field will recognize that ripping at a lower resolution does increase the error slightly, and that alternate dpi resolutions, such as 100 dpi or 300 dpi could be used to reduce this error at the cost of slowing the speed at which the job can be ripped and the time for an estimate to be generated. Thus 75 dpi provides an adequate resolution for estimating the actual toner coverage without incurring the complexity, storage and time for ripping at the full resolution, this provides a good compromise between speed and accuracy.

If, for example, the maximum imageable surface area of a specific printer on which this process has been implemented is 18.5 inches by 13.8 inches. The total pixel count of this printer is 18.5×600 dpi×13.8×600 dpi=91,908,000 total pixels. The following example uses these figures to help describe the last step.

The last step that must be performed is to scale the toner mass values by the difference in rip resolutions, 75 dpi is ⅛ the resolution of 600 dpi, the difference in area coverage is 600×600/75×75=64. This gives us the scaling factor that needs to be used to adjust the toner surface mass from the 75 dpi resolution (which would take up only 1/64 of the area) to the 600 dpi of the press.

The steps to determine the toner coverage and intensity of the job to be cost estimated are then as follows. To determine the toner consumption within the specific Job to be cost estimated, the toner mass for every surface within the print job is calculated at the reduced dot per inch resolution of 75 dpi. As described above for calculating the toner cost coefficient (TCC), when possible each pixel density value is screened. The same mapping shown in FIG. 5 is applied to the pixel density data to provide a toner mass value with a constant linear relationship to toner mass values calculated at other pixel densities. The following 7 steps are followed to generate the toner consumption value for the job:

1. To capture the coverage and pixel intensity information, for each substrate sized sheet surface and each color channel of that surface the rasterized toner data is scanned by row and column.

2. If available a halftoning process is performed on the continuous tone pixel data by indexing the pixel data through a specific halftone screen defined for the pixel intensity. The screened output pixel data at each position is then mapped into a toner weight using the relationship specified in FIG. 5. If the halftone screens are not available, the contone image data is also mapped through the relationship in FIG. 5 with the output values now providing a relative linear toner mass relationship instead of an exact mass. The toner mass data is then aggregated into a total toner mass for the surface.

3. The Print Processor component aggregates the toner mass data for each color channel of each surface into individual color channel specific toner weight values until all surfaces of the print job to be cost estimated have been processed. Each of these is termed a job aggregate mass (JAM).

4. The aggregated toner mass values (JAM) are adjusted for the additional toner that would be consumed if the job had been processed at full 600 dpi resolution of the destination press instead of at the reduced 75 dpi resolution used. Rendering at 75 dpi gives us an image that would only be ⅛ the width and height of an image rendered at 600 dpi if printed on the same press. Therefore the toner mass is adjusted for this.

Total surface pixels per square inch at 600 dpi is 600×600=360,000 pixels

Total surface pixels per square inch at 75 dpi is 75×75=5625

The consumption adjustment factor (CAF) is then 360,000/5625=64

JTU=Actual Toner Mass Consumption=JAM*CAF=JAM*64

5. The Job Cost Values (JTU, JSUR and JPAGE) are then multiplied by the associated Press Cost Coefficients (TCC, PWC and SCC) for the specific printer and summed to provide an accurate cost to the end-user for the print job. If the Print shop has more than one printer, the tool can run through each set of press cost coefficient and corresponding job cost values to identify alternate printer costs for the specific job.

Let $TCC_{Black}$, $TCC_{Cyan}$, $TCC_{Yellow}$, $TCC_{Magenta}$ represent the Press Toner coefficients for a specific press.

Let $JTU_{Black}$, $JTU_{cyan}$, $JTU_{Yellow}$, and $JTU_{Magenta}$ represent the Job Toner Usage values for the job to be cost estimated.

6. The total toner cost for a job can then be calculated as the sum of the following:

$$\text{Black\_Toner\_Cost}=TCC_{Black}\times JTU_{Black}$$

$$\text{Cyan\_Toner\_Cost}=TCC_{cyan}\times JTU_{Cyan}$$

$$\text{Magenta\_Toner\_Cost}=TCC_{Magenta}\times JTU_{Magenta}$$

$$\text{Yellow\_Toner\_Cost}=TCC_{Yellow}\times JTU_{Yellow}$$

Total_Toner_Cost=Black_Toner_Cost+Cyan_Toner_Cost+Magenta_Toner_Cost+Yellow_Toner_Cost The Press Wear cost for the job is then the press ware cost per substrate surface multiplied by the number of surfaces:

Press_Wear_Cost=PWC*JSUR

The substrate cost is the substrate cost per page multiplied by the total number of pages to be printed:

Substrate_Cost=SCC*JPAGE

7. The total cost to print the job is then the sum of the three individual costs:

Total_Cost_to_Print=Total_Toner_Cost+Press_Wear_Cost+Substrate_Cost

As an example to show the application of the toner calculations, lets consider a job printing only black toner with (a) 2,000 simplex pages (2,000 surfaces) and (b) 40% coverage of an 8 inch by 10 inch surface at (c) 100% image intensity.

The total toner pixels in the printed surface are 28,800,000 (600×10×600×8) pixels. At 40% coverage the total number of pixels with a density of 255 is 11,520,000 and all other pixels in the surface have a zero density. Assume the Density to Mass function for a density of 255 gives a mass value of $1.3^{-7}$ per pixel and the total surface mass is then 11,520,000* $1.3^{-7}$=1.4976 (e). Lets also assume that this job was re-run continuously during the replacement of (f) ten bottles of toner and (g) that 9 jobs were completed during this time.

The total toner mass ($JTU_{black}$) for each job is then: 2,000 surfaces*1.4976=2,995.2.

The value of toner consumed (jtTotal) for the time range is then:

$$2{,}995.2*9\text{jobs}=26{,}956.8\ \text{jtcTotal}_{black}$$

Each bottle of toner has 2,000 grams of ink and bottles were used the total toner consumption is 20,000 grams Toner.

The value of gjmK is then 20,000/26, 956.8=0.741927825 $\text{gjmK}_{black}$

If the cost of each bottle of toner is $100 then the cost of a gram of toner is 100/2000=$0.05 (five cents).

The value of TCC is then gjtK*cost of a gram of toner:

$$TCC_{black}=0.741927825*0.05=0.037096391$$

Based on these values we can determine that each job printed cost ($JTU_{black}$*$TCC_{black}$) 2,995.2*0.037096391=$111.11 and ink consumed ($JTU_{black}$*$\text{gjmK}_{black}$) 2,995.2*0.741927825=2222.22 grams of toner.

The values above and throughout this disclosure where chosen for illustrative purposes only and are examples. For instance 20,000 simplex pages may be any large number of pages and the number of times the job was reprinted may have been any number in (g) and not limited to 500.

The following example illustrates how a Job is to be cost estimated. For this job, after rasterizing the data it is determined that the job consists of 1,000 surfaces with an identical substrate size of 8 inches by 10 inches and a substrate percent coverage of 20% and an average intensity of 100%. The total number pixels on an 8×10 inch surface at 75 dpi is 450,000, at 20% coverage there is 90,000 pixels with a density of 255 and all other pixels are zero. If the Density to Mass function gives a mass value of $1.3^{-7}$ . The total mass of one surface is then 90,000*$1.3^{-7}$=0.0117. Using the scaling from 75 dpi to 600 dpi we have 0.0117*64=0.7488 being the computed surface mass of one surface of the print job. Since the job has 1,000 surfaces the total toner mass (JTU) is then 748.8, the dollar cost is then 748.8*0.037096391=$27.78 (the total grams toner consumed is 748.8*0.741927825=555.55 grams).

Since this job has similar characteristics to the job used to determine the Press TCC value, we can see that this job should use ½ the toner per page and prints half the total number of pages, so the cost should be ¼ that of the initial job.

The values above and throughout this disclosure where chosen for illustrative purposes only and are examples. For instance 20,000 simplex pages may be any large number of pages and the number of times the job was reprinted may have been any number in (g) and not limited to 500. Also any of the procedure may be repeated The invention has been described in detail with particular reference to certain preferred embodiments thereof, but it will be understood that variations and modifications can be effected within the spirit and scope of the invention.

The invention claimed is:

1. A method of automated cost determination for a print job using a printer controller, said method comprising:

a.) determining a future toner cast using a toner cost coefficient (TCC) based on historical toner consumption comprising:

i) determining a volume-weighted toner cost constant per job mass value (gimK) determined by dividing a total actual toner weight used over a desired time period by a total calculated toner mass usage value (jtcTotal) using historical toner consumption stored values;

ii) determining the toner cost coefficient (TCC) by multiplying the volume-weighted toner cost constant per job mass value (gimK) by a historical toner cost per weight stored value from historical stored values; and iii) determining the future toner cost for the job by multiplying the TCC by a toner mass consumption (JTU) value such that total toner cost =[JTU* TCC];

b) determining a future press usage cost using a press wear coefficient (PWC) based on historical operator replaceable component (ORC) stored values;

c.) rasterizing the print job to determine a future surface count to be printed for the print job;

d.) determining a substrate cost based on the surface count and a substrate cost coefficient (SCC) based on historical substrate costs; and e.) determining a total job cost by adding the future toner cost to the substrate cost and the future press usage cost using a single-action selection component that in response to performance of only a single action, sends a request to the printer controller to select from stored data including one or more of SCC, TCC, and PWC, the request including an identifier so that the printer controller can access the stored data to complete the determination of the total job cost.

2. The method of claim 1, the step of determining the toner cost further comprising determining a media independent TCC by dividing the total grams of toner consumed by the toner laydown mass using historical toner mass and ink replacement machine-specific stored values from a set historical time period (t2–t1) for each color channel (CMYK).

3. The method of claim 1 further comprising calculating the (JTU*TCC) value for each channel and summing up the (JTU * TCC) values for all the channels.

4. The method of claim 1, the step of determining the JTU using a surface toner consumption calculated by rasterizing the job using a reduced dpi that is lower then a press dpi.

5. The method of claim 4, the step of determining the toner cost further comprising using a ratio of press dpi to reduced dpi to adjust surface toner consumption when determining the job.

6. The method of claim 1, the step of determining the toner cost further comprising determining the total toner cost by summing individual color channel toner costs for CMYK As follows:

$$\text{Cost}_{Cyan} = JTU_{Cyan} * TCC_{Cyan}$$
$$\text{Cost}_{Magenta} = JTU_{Magenta} * TCC_{Magenta}$$
$$\text{Cost}_{Yellow} = JTU_{Yellow} * TCC_{Yellow}$$
$$\text{Cost}_{Black} = JTU_{Black} * TCC_{Black}$$
$$\text{Toner Cost} = \text{Cost}_{Black} + \text{Cost}_{Cyan} + \text{Cost}_{Magenta} + \text{Cost}_{Yellow}.$$

7. The method of claim 1, the step of determining the total toner cost by summing the individual toner costs (TCC * JTU) further comprising summing atoner mass consumed values for all surfaces.

8. The method of claim 1, the step of determining the press usage cost further comprising calculating a total press wear cost by determining a media independent historical press wear value using historical press wear machine-specific stored values from a set historical time period (t2−t1) and summing these up for the time period.

9. The method of claim 8, the step of determining the press usage cost further comprising using different sets of automatically generated press cost coefficients from multiple printers.

10. The method of claim 8, the step of determining the press usage cost further comprising using ORC replacement data and ORC average life information to calculate PWC.

11. The method of claim 10, the step of determining the PWC further comprising recalculating the PWC on a periodic basis.

12. The method of claim 10, the step of determining the PWC further comprising recalculating the PWC when a purchase price adjustment takes place.

13. The method of claim 1, the step of determining the toner cost using a toner cost coefficient based on historical toner consumption further comprising generating an empirical relationship between post-screen toner density data and toner mass consumption.

14. The method of claim 13, further comprising generating an empirical non-linear relationship between post-screen toner density data and toner mass consumption.

15. The method of claim 13, further comprising using the empirically derived relationship when creating press toner cost coefficients when there is no post screened data available.

16. The method of claim 13, further comprising using the empirically derived relationship for converting toner pixel density to toner mass.

17. The method of claim 16, further comprising using the empirically derived relationship to calculate relative toner consumption from the actual toner mass empirical data.

18. The method of claim 16, further comprising using the toner replacement information to map the calculated toner mass to actual toner consumption.

* * * * *